(12) United States Patent
Takahashi et al.

(10) Patent No.: US 11,383,698 B2
(45) Date of Patent: Jul. 12, 2022

(54) DEVICE AND METHOD FOR CONTROLLING VEHICLE MOVEMENT, AND DEVICE AND METHOD FOR GENERATING TARGET COURSE

(71) Applicant: Hitachi Automotive Systems, Ltd., Hitachinaka (JP)

(72) Inventors: Junya Takahashi, Tokyo (JP); Yuki Akiyama, Tokyo (JP); Kenta Maeda, Tokyo (JP); Naoki Hiraga, Hitachinaka (JP); Toshiyuki Innami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 170 days.

(21) Appl. No.: 16/631,708

(22) PCT Filed: Jul. 26, 2018

(86) PCT No.: PCT/JP2018/028028
§ 371 (c)(1),
(2) Date: Jan. 16, 2020

(87) PCT Pub. No.: WO2019/031255
PCT Pub. Date: Feb. 14, 2019

(65) Prior Publication Data
US 2020/0164870 A1      May 28, 2020

(30) Foreign Application Priority Data
Aug. 10, 2017 (JP) .............................. JP2017-155858

(51) Int. Cl.
*B60W 30/045* (2012.01)
*B60W 30/02* (2012.01)
(Continued)

(52) U.S. Cl.
CPC ........ *B60W 30/025* (2013.01); *B60W 30/045* (2013.01); *B60W 40/08* (2013.01);
(Continued)

(58) Field of Classification Search
CPC .. B60W 30/025; B60W 30/045; B60W 40/08; B60W 2520/10; B60W 2520/16;
(Continued)

(56) References Cited

U.S. PATENT DOCUMENTS

| 8,676,464 B2* | 3/2014 | Shimura | ............... B60W 30/02 701/72 |
| 2009/0192675 A1 | 7/2009 | Yamakado | |
| 2010/0055649 A1* | 3/2010 | Takahashi | ............. B60W 40/09 434/66 |
| 2012/0179349 A1* | 7/2012 | Yamakado | .......... B60W 10/184 701/89 |

(Continued)

FOREIGN PATENT DOCUMENTS

| JP | 2005-200847 A | 7/2005 |
| JP | 2007-290650 A | 11/2007 |

(Continued)

OTHER PUBLICATIONS

International Search Report with English translation and Written Opinion issued in corresponding application No. PCT/JP2018/028028 dated Nov. 13, 2018.

*Primary Examiner* — Donald J Wallace
*Assistant Examiner* — Daniel M. Robert
(74) *Attorney, Agent, or Firm* — Foley & Lardner LLP

(57) ABSTRACT

Provided are: a device and a method for controlling vehicle movement, with which it is possible to suppress causing uncomfortableness to vehicle occupants and causing unstable behavior during turning by automatic travel control; and a device and a method for generating a target course. In a vehicle capable of automatically controlling lateral acceleration occurring in the vehicle, the present invention controls the acceleration occurring in the vehicle such that jerk, which is the change over time of acceleration, (Continued)

becomes the greatest in a region where the lateral acceleration that occurs upon entering a curve is equal to or less than half the acceleration during normal turning, and the jerk decreases as the acceleration increases.

8 Claims, 10 Drawing Sheets

(51) Int. Cl.
  *B60W 40/08* (2012.01)
  *G05D 1/00* (2006.01)
  *G05D 1/02* (2020.01)
(52) U.S. Cl.
  CPC ......... *G05D 1/0088* (2013.01); *G05D 1/0212* (2013.01); *G05D 1/0214* (2013.01); *G05D 1/0223* (2013.01); *G05D 2201/0213* (2013.01)
(58) Field of Classification Search
  CPC ......... B60W 2520/14; B60W 2520/18; B60W 2552/30; B60W 2720/14; B60W 2720/125; B60W 2520/125; G05D 1/0088; G05D 1/0214; G05D 1/0223; G05D 2201/0213; G05D 1/0212
  See application file for complete search history.

(56) References Cited

U.S. PATENT DOCUMENTS

| | | |
|---|---|---|
| 2012/0316744 A1 | 12/2012 | Shimura |
| 2013/0006473 A1 | 1/2013 | Buerkle |
| 2014/0145498 A1* | 5/2014 | Yamakado ............ B60W 30/02 303/3 |
| 2014/0180554 A1* | 6/2014 | Takahashi ............. B60W 40/10 701/70 |
| 2015/0094924 A1 | 4/2015 | Takahashi |
| 2015/0094927 A1* | 4/2015 | Takahashi ........... B60W 30/025 701/93 |
| 2015/0239442 A1* | 8/2015 | Yamakado ............ B60W 10/08 701/70 |
| 2016/0347181 A1 | 12/2016 | Yamakado |
| 2018/0297594 A1 | 10/2018 | Takahashi |

FOREIGN PATENT DOCUMENTS

| | | |
|---|---|---|
| JP | 2008-285066 A | 11/2008 |
| JP | 2013-513149 A | 4/2013 |
| JP | 2015-067271 A | 4/2015 |
| JP | 2015-193329 A | 11/2015 |
| JP | 2017-001520 A | 1/2017 |
| JP | 2017-081482 A | 5/2017 |
| WO | WO-2012/042935 A1 | 4/2012 |

* cited by examiner

DEVICE AND METHOD FOR CONTROLLING VEHICLE MOVEMENT, AND DEVICE AND METHOD FOR GENERATING TARGET COURSE

TECHNICAL FIELD

The present invention relates to a vehicle movement control device and a vehicle movement control method, for controlling traveling of a vehicle such as an automobile, and a target course generation device and a target course generation method, for generating a target course on which a vehicle travels.

BACKGROUND ART

Development of an advanced driver assistance system (ADAS) and automatic driving related technologies in automobiles has been rapidly advanced in recent years. Adaptive cruise control, lane keeping assist systems, emergency automatic braking, etc. have come into practical use as functions to automate part of the driving operation. However, these are systems that automatically control only one of the longitudinal movement and lateral movement of a vehicle. To realize a smooth vehicle movement in a driving scene that a vehicle turns with acceleration/deceleration, for example, on a curved road where a curvature is tight and the lateral acceleration becomes excessive when the vehicle drives at a constant speed, or when a vehicle overtakes or merges, etc., a control method for comprehensively dealing with longitudinal movement and lateral movement has not been established in the actual situation.

Regarding the lateral movement of a vehicle, for example, PTL 1 is cited as a related prior art.

PTL 1 describes that it is not sufficient to travel along a curve shape of a road for smooth driving in an automatic driving, and discloses a method of driving while modifying a course so as to have a section in which a rate of change of road curvature is constant.

Further, for example, PTL 2 describes a method of moderating a change in lateral force acting on a vehicle and an occupant by making a curvature change rate of a track continuous in railway track design.

However, neither of the above-described PTLS 1 and 2 describes the case of driving on a curve with acceleration/deceleration.

On the other hand, as a control technique in which acceleration/deceleration of a vehicle is associated with lateral movement, PTL 3 proposes an acceleration/deceleration control method based on lateral jerk (change over time or rate of change of lateral acceleration) occurring by steering.

CITATION LIST

Patent Literature

PTL 1: JP 2013-513149 A
PTL 2: JP 2005-200847 A
PTL 3: JP 2008-285066 A

SUMMARY OF INVENTION

Technical Problem

However, the acceleration/deceleration control in PTL 3 is based on the premise that a human driver himself is responsible for steering for lateral movement. When a human driver drives, it is considered that strict course tracking control is not performed for a predetermined traveling course, and while always assuming the approximate course and acceleration/deceleration that the driver wants to travel ahead, lateral movement and longitudinal movement of the vehicle are controlled at the same time. For this reason, in automatic driving by course tracking simply along the road shape, it is not clear how to achieve smooth movement with acceleration/deceleration, and a problem is a method of generating lateral movement and controlling acceleration/deceleration considering acceleration/deceleration.

The present invention has been made in view of the above circumstances, and an object of the present invention is to provide a device and method for controlling a vehicle movement and a device and method for generating a target course, which can suppress the occurrence of unstable behavior of a vehicle due to acceleration change during turning by automatic traveling control, and to improve passenger comfort.

Solution to Problem

In order to solve the above-described problems, in a device and method for controlling a vehicle movement, in a vehicle capable of automatically controlling lateral acceleration occurring in the vehicle, when the vehicle turns such that a road curvature absolute value of a travel path increases and reaches a maximum value or is made constant, regarding acceleration occurring in the vehicle, a state in which the lateral acceleration during the turning is maximized is defined as a steady turning state, when a region with the lateral acceleration equal to or less than half of the lateral acceleration in the steady turning state is defined as a first region, a region with the lateral acceleration larger than half of the lateral acceleration in the steady turning state is defined as a second region, the acceleration occurring in the vehicle controlled such that jerk, which is a change over time of the acceleration occurring in the vehicle, is maximized in the first region, and the time average of jerk in the first region becomes larger than the time average of jerk in the second region.

Further, in a device and method for generating a target course according to the present invention are characterized in that, in a vehicle capable of automatically controlling lateral acceleration occurring in the vehicle, when the vehicle turns such that a road curvature absolute value of a travel path increases and reaches a maximum value or is made constant, regarding acceleration occurring in the vehicle, a state in which the lateral acceleration during the turning is maximized is defined as a steady turning state, when a region with the lateral acceleration equal to or less than half of the lateral acceleration in the steady turning state is defined as a first region, a region with the lateral acceleration larger than half of the lateral acceleration in the steady turning state is defined as a second region, the target course is generated such that jerk, which is a change over time of the acceleration occurring in the vehicle, is maximized in the first region, and the time average of jerk in the first region becomes larger than the time average of jerk in the second region.

Advantageous Effects of Invention

According to the present invention, for example, jerk occurring when a vehicle that has traveled in a straight section reaches a steady turning state is maximized in a region where lateral acceleration occurring is small, and by suppressing the acceleration change in a state in which the acceleration occurring is large, it is possible to suppress the occurrence of unstable behavior of the vehicle due to acceleration change during turning by automatic traveling control, and the effect of improving passenger comfort is also expected.

Issues, configurations, and effects other than the above are clarified by descriptions of the following embodiments.

DESCRIPTION OF EMBODIMENTS

Hereinafter, embodiments of the present invention will be described with reference to drawings.

Overview of Embodiment

Prior to describing specific embodiments, to facilitate understanding of the present invention, first, an acceleration control method for entering a curve from a straight road and reaching a steady turning state will be described with reference to FIGS. 1 to 4B. Note that, in this example, when the center of gravity of a vehicle is the origin, the longitudinal direction of the vehicle is defined as x, and the direction perpendicular thereto (the lateral (left and right) direction of the vehicle) is defined as y, the acceleration in the x direction is the longitudinal acceleration, and the acceleration in the y direction is the lateral acceleration. Further, the longitudinal acceleration is set to positive in the vehicle front direction, that is, when the vehicle is traveling with respect to the front direction, the longitudinal acceleration that increases a speed is set to positive. Further, when the vehicle is moving forward, the lateral acceleration that occurs when turning counterclockwise is set to positive, and the reverse direction is set to negative. Further, the counterclockwise turning radius is set to positive, and the reciprocal thereof is set to a vehicle traveling curvature. Similarly, regarding the target course, the counterclockwise turning radius is set to positive, and the reciprocal thereof is set to a target course curvature. Further, the steering angle in the counterclockwise direction is set to positive.

Figure 1:
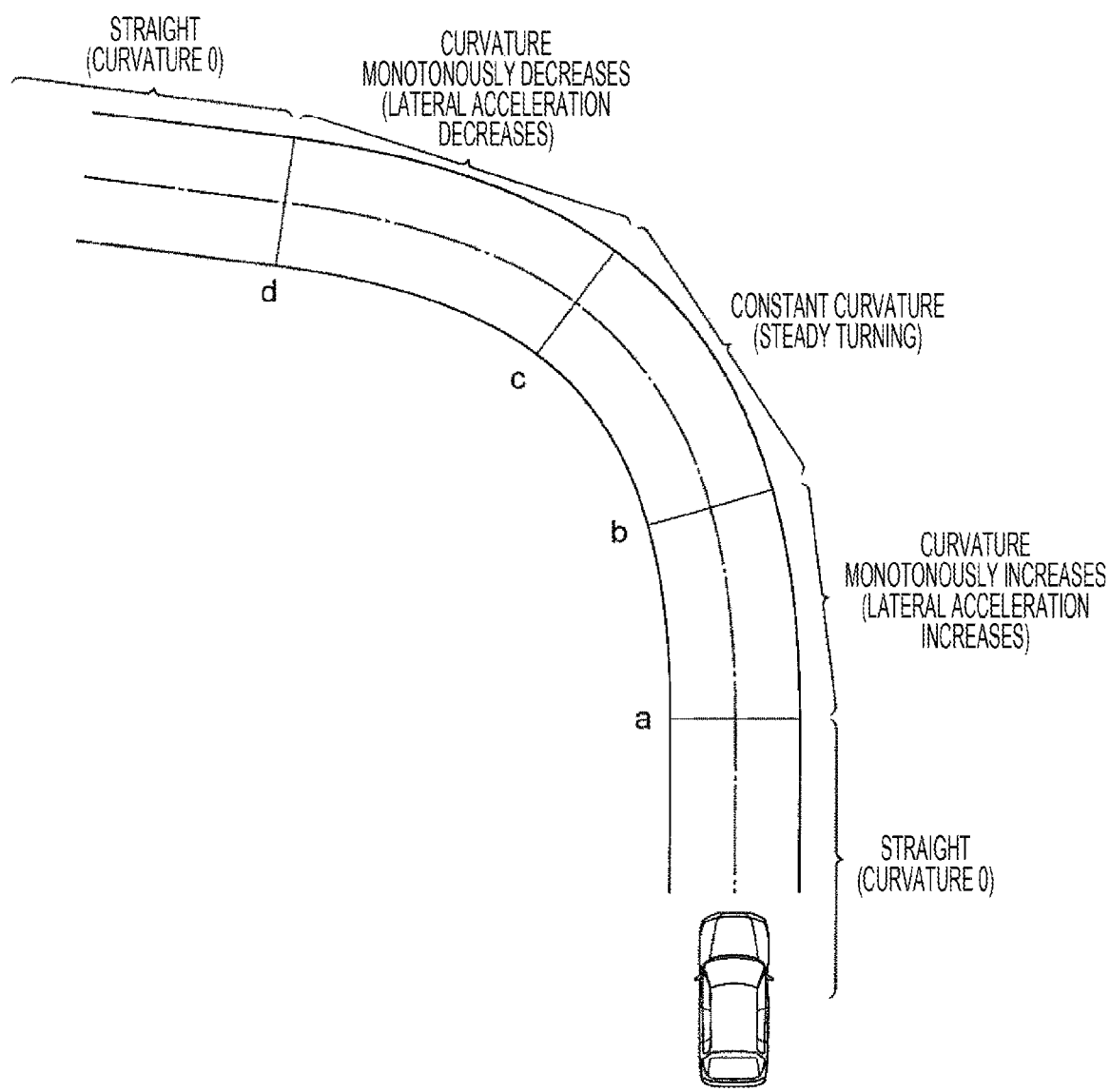
FIG. 1 is a view illustrating a part of a road shape including a curve section.

For describing speed control of the present embodiment, FIG. 1 illustrates a conceptual diagram of a straight section (curvature 0), a relaxation curve section (monotonous curvature change), a curved road (road including a curve section) with a constant curvature section (steady turning), and a vehicle traveling there.

Figure 2:
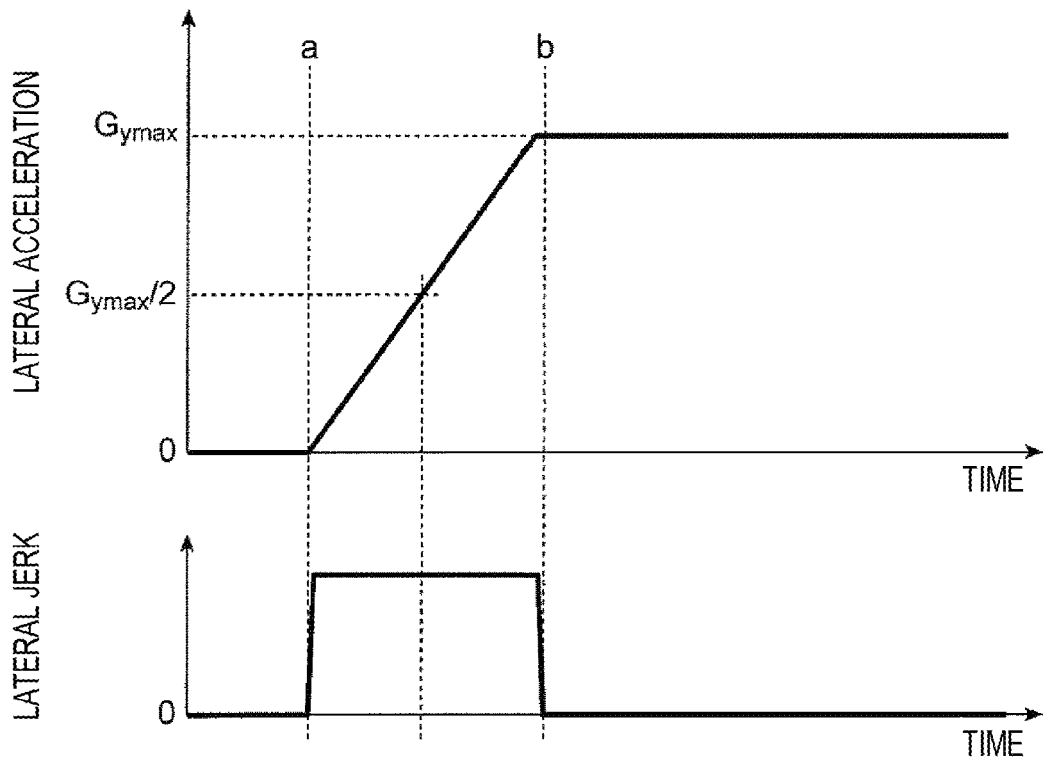
FIG. 2 is diagrams illustrating lateral acceleration and lateral jerk when a vehicle travels at a constant speed on a traveling course having a clothoid curve.

FIG. 2 indicates, as one aspect of the lateral acceleration control of a vehicle, lateral acceleration and the change over time of the lateral acceleration (lateral jerk) in the case of traveling at a constant speed such that a traveling course of the relaxation curve section that becomes a monotonous curvature increase from a to b of FIG. 1 becomes a clothoid curve. That is, FIG. 2 indicates a typical lateral acceleration change that occurs in a vehicle when the vehicle travels at a constant speed in a relaxation curve section including a clothoid curve.

In the section from a to b of FIG. where the curvature monotonically increases, when a vehicle travels at a constant speed on a traveling course that becomes a clothoid curve, the lateral acceleration increases linearly as illustrated in FIG. 2, and reaches the lateral acceleration during steady turning (maximum value) $G_{ymax}$. At this time, the lateral jerk occurring in the vehicle has a substantially constant value from a to b of FIG. 2.

In this case, the lateral jerk is large until the vicinity of b of FIG. 2, that is a region where the lateral acceleration occurring in the vehicle is large, and depending on a road surface condition or the like, unstable behavior may occur due to a large change in the lateral acceleration. Furthermore, the acceleration change in the state where the acceleration occurring in a vehicle large may give a passenger discomfort.

Figure 3:
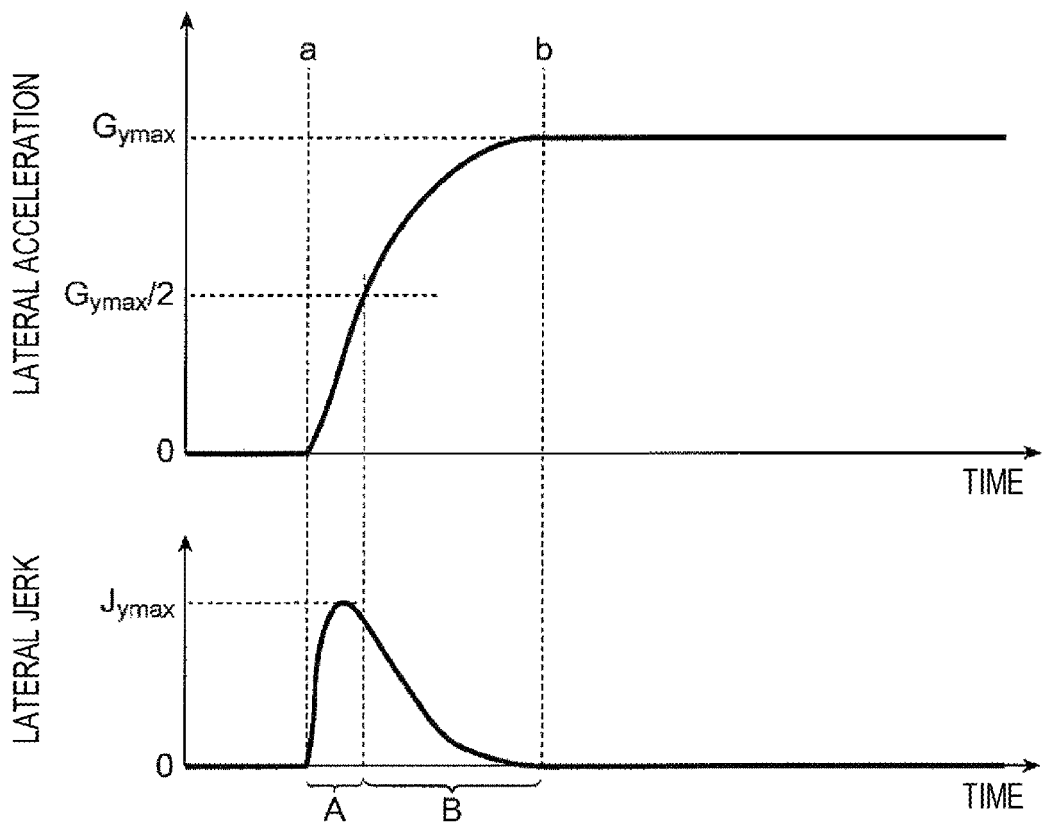
FIG. 3 is diagrams illustrating lateral acceleration and lateral jerk when a vehicle travels at a constant speed such that the lateral jerk becomes maximum in a region where the lateral acceleration is small.

In the present embodiment, in consideration of the relationship between the acceleration and jerk, by controlling the acceleration occurring in a vehicle (automatically) so as to suppress jerk in a region where acceleration is large, the occurrence of unstable vehicle behavior due to changes in acceleration is suppressed, and passenger comfort is improved. Specifically, as illustrated in FIG. 3, in the relaxation curve section where the curvature monotonously increases from a to b of FIG. 1, the lateral jerk occurring in the vehicle takes the maximum value $J_{ymax}$ in region where the lateral acceleration is small. Thereafter the acceleration occurring in the vehicle is controlled such that the lateral jerk decreases as the lateral acceleration increases. Here, the region where the lateral acceleration is small is a region (region A) where the lateral acceleration occurring in the vehicle is half or less of the lateral acceleration (maximum value) $G_{ymax}$ occurring during steady turning, and the region where the lateral acceleration is large is a region (region B) where the lateral acceleration occurring in a vehicle is greater than half of the lateral acceleration (maximum value) $G_{ymax}$ occurring during steady turning.

Hereinafter, traveling in which the traveling course at the time of traveling a relaxation curve section is a clothoid curve is referred to as clothoid curve traveling, and the traveling according to the present embodiment is referred to as non-clothoid curve traveling.

Figure 4A:
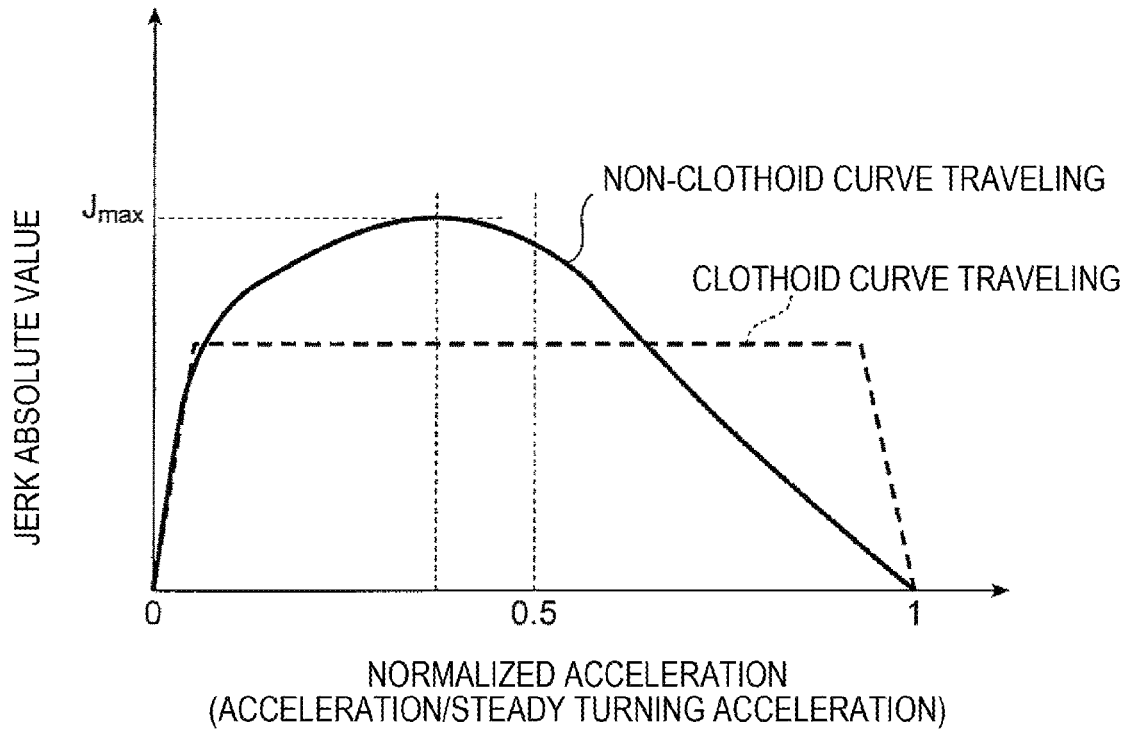
FIG. 4A is a diagram illustrating a relationship between an absolute value of jerk and a normalized acceleration obtained by normalizing acceleration with a steady turning acceleration.

FIG. 4A indicates the relationship between jerk absolute value and normalized acceleration obtained by normalizing the acceleration occurring in a vehicle with the acceleration (steady turning acceleration) occurring in a vehicle during steady turning (steady turning state) in the case of the clothoid curve traveling and the non-clothoid curve traveling. When the horizontal axis indicates the normalized acceleration, and the vertical axis indicates the jerk absolute value, in the clothoid curve traveling, the jerk absolute value becomes almost constant as the normalized acceleration increases. On the other hand, in the non-clothoid curve traveling (present embodiment), in the region where the normalized acceleration is smaller than 0.5 (in the illustrated example, the region from 0.3 to 0.5), the jerk absolute value takes the maximum value $J_{max}$ and then tends to decrease as the normalized acceleration increases.

Figure 4B:
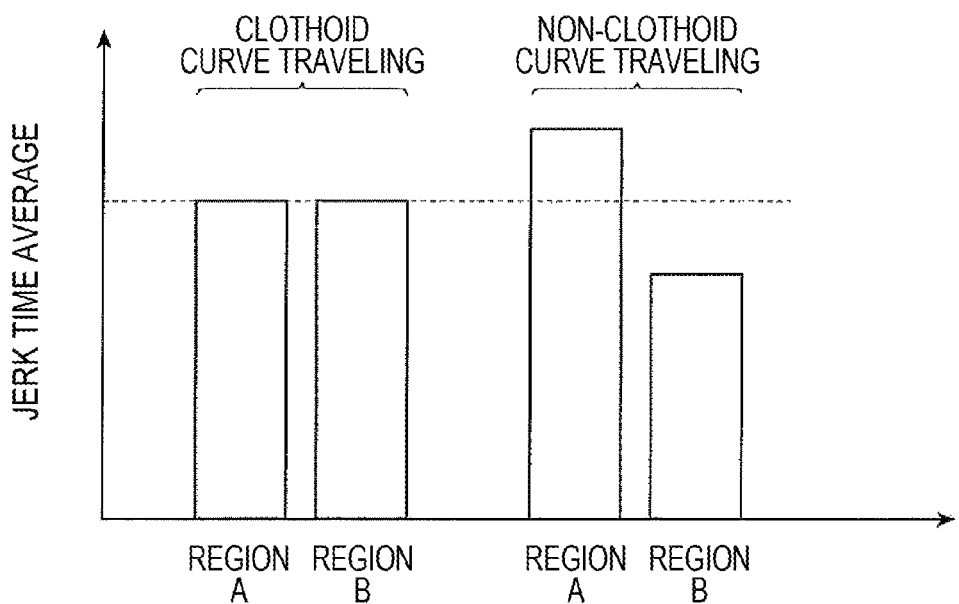
FIG. 4B is a diagram illustrating a time average of jerk when a vehicle travels at a constant speed on a traveling course having a clothoid curve and when a vehicle travels at a constant speed such that the lateral jerk becomes maximum in a region where the lateral acceleration is small.

Further, FIG. 4B indicates time averages of jerk in each of the regions A and B in the case of each of clothoid curve traveling and non-clothoid curve traveling. As illustrated in FIG. 4B, in the clothoid curve traveling, the time average of jerk in the region A and the time average of jerk in the region B are substantially the same. On the other hand, in the non-clothoid curve traveling (present embodiment), the time average of jerk in the region A is larger than the time average of jerk in the region B.

Note that, FIGS. 3 and 4A described above illustrate the relationship between the lateral acceleration (absolute value), which is the acceleration generated in the lateral direction of a vehicle during constant speed driving and the lateral jerk (absolute value), which is the change over time of the lateral acceleration. However, even with longitudinal acceleration, the longitudinal acceleration and the lateral acceleration may be controlled such that the relationship between resultant acceleration (absolute value) of the lateral acceleration (absolute value) generated in the vehicle lateral direction and the longitudinal acceleration (absolute value) generated in the vehicle longitudinal direction and the resultant jerk (absolute value) which is the change over time or rate of change of the resultant acceleration (absolute value) becomes the relationship illustrated in FIG. 3. Further, similarly, the longitudinal acceleration and the lateral acceleration may be controlled such that the relationship between the normalized resultant acceleration obtained by normalizing the resultant acceleration with the resultant acceleration during steady turning and the absolute value of the change over time of the resultant acceleration (resultant jerk) becomes the relationship illustrated in FIG. 4A.

By performing such acceleration (lateral acceleration or longitudinal acceleration and lateral acceleration) control, it is possible to suppress the occurrence of unstable behavior of the vehicle due to acceleration changes during turning by automatic traveling control, and to improve passenger comfort.

First Embodiment

Hereinafter, the configuration and operation of a vehicle movement control device according to a first embodiment of the present invention will be described with reference to FIGS. 5 to 9.

First, a vehicle equipped with the vehicle movement control device according to the first embodiment of the present invention and the configuration of the vehicle movement control device will be described with reference to FIGS. 5 and 6.

Figure 5:
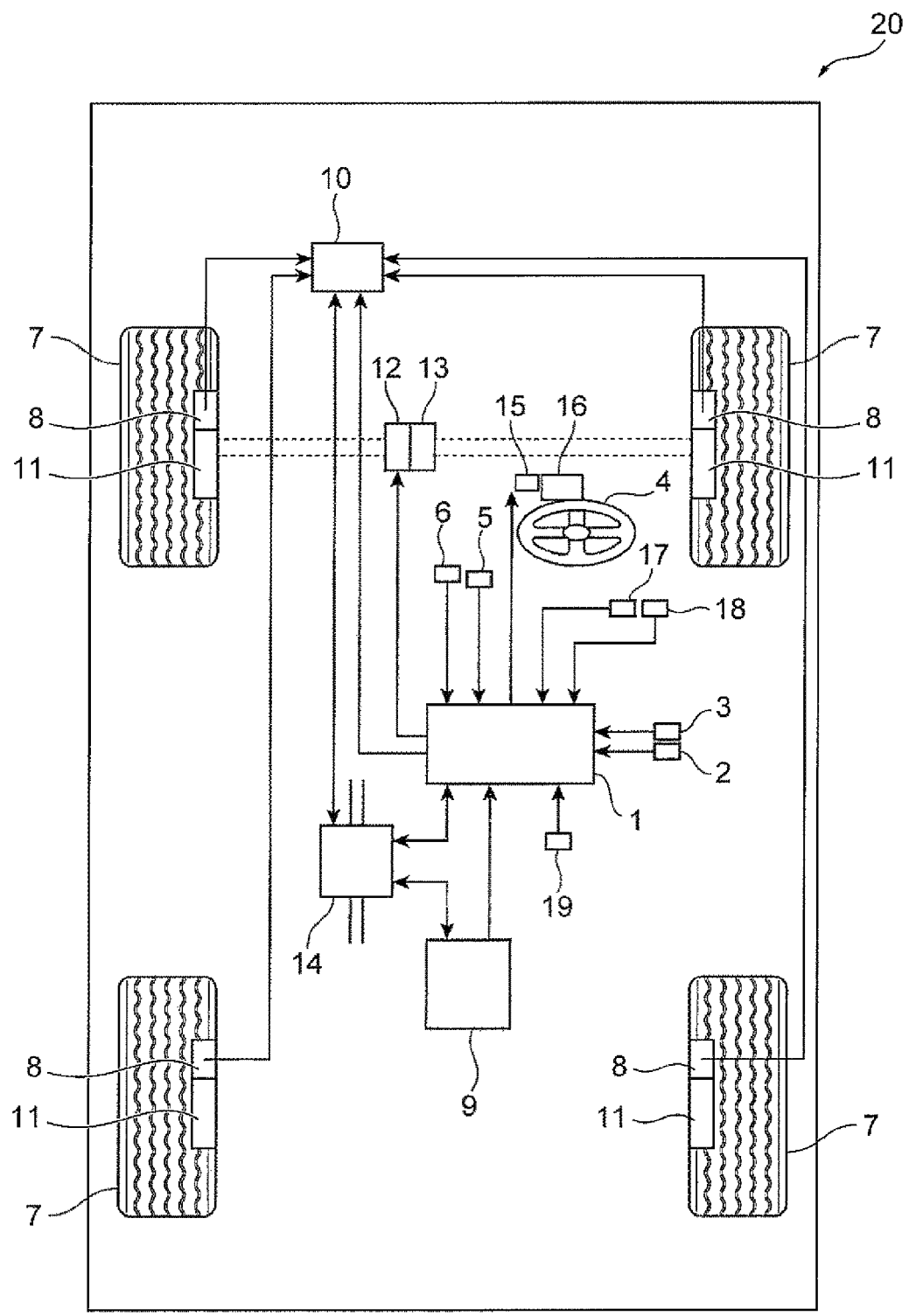
FIG. 5 is a conceptual view of a vehicle equipped with a first embodiment of a vehicle movement control device according to the present invention.

FIG. 5 is a configuration diagram of a vehicle equipped with the vehicle movement control device according to the first embodiment of the present invention.

The vehicle movement control device 1 of the present embodiment is equipped with the vehicle 20. The vehicle movement control device 1 performs calculations necessary for acceleration control based on various information obtained from sensors (an acceleration sensor 2, a gyro sensor 3, and a wheel speed sensor 8) that acquire vehicle movement state information, sensors (a steering angle sensor 5, a brake pedal sensor 17, and an accelerator pedal sensor 18) that acquire driver operation information, and sensors (a course shape acquisition sensor 6, a host vehicle position detection sensor 9, and an outside information detection sensor 19) that acquire host vehicle travel path information. Based on the calculation result, the vehicle movement control device 1 transmits a control command value through a communication line 14 to each control unit (a brake control unit 10, a driving torque control unit 12, and a steering angle control unit 15) that performs drive control of actuators (a brake actuator 11, a drive actuator 13, and a steering angle control actuator 16) that can control the longitudinal acceleration and/or the lateral acceleration generated in the vehicle.

Here, the sensor that acquires the vehicle movement state information may be any sensor or means that can acquire vehicle speed, longitudinal acceleration, lateral acceleration, and yaw rate, and is not limited to the above-described sensor configuration. For example, the vehicle speed may be acquired by differentiating position information obtained by a global positioning system (GPS). Further, the yaw rate, longitudinal acceleration, and lateral acceleration of a vehicle may be acquired using an image acquisition sensor such as a camera. Further, the vehicle movement control device 1 may not have a direct sensor input. For example, necessary information may be acquired through the communication line 14 from another control unit (for example, the brake control unit 10).

As long as a sensor to acquire driver operation information can acquire the operation amount of the steering wheel 4 by a driver, and the operation amount of a brake pedal and an accelerator pedal (not illustrated), the vehicle movement control device 1 may not have a direct sensor input, like acquisition of the vehicle movement state information described above. For example, necessary information may be acquired through the communication line from another control unit (for example, the brake control unit 10).

As the host vehicle position detection sensor 9, a global positioning system (GPS) is used as a sensor for acquiring host vehicle travel path information. As the outside information detection sensor 19, a sensor such as a camera or a radar that can detect an obstacle around the host vehicle and detect a travelable area is used. As the course shape acquisition sensor 6, a sensor that can acquire travel route information of the host vehicle such as a navigation system can be used. Here, the sensor for acquiring the host vehicle travel path information may be any means that can acquire the course shape and the travelable area in the traveling direction of the host vehicle, and is not limited to these sensors. For example, a method may be used which acquires a course shape in front of the host vehicle by communication with a data center or a device that transmits road information disposed on the road, or a method may be used which acquires an image in front of or around the host vehicle or both by an imaging unit such as a camera and acquires a course shape in front of the host vehicle. Further, a method of acquiring from the unit that calculates the course shape in the traveling direction of the host vehicle through the communication line 14 by any of these means or a combination thereof may be used.

An acceleration/deceleration actuator (brake actuator 11, drive actuator 13) that can control the longitudinal acceleration occurring in the vehicle 20 is an actuator capable of controlling the longitudinal acceleration occurring in the vehicle 20 by controlling the force generated between the tire 7 and the road surface, and an acceleration/deceleration actuator capable of controlling the longitudinal acceleration can be applied, for example, a combustion engine capable of controlling the braking/driving torque applied to the tire 7 by controlling a combustion state to control the longitudinal acceleration of the vehicle 20, an electric motor capable of controlling the braking/driving torque applied to the tire 7 by controlling the current to control the longitudinal acceleration of the vehicle 20, a transmission capable of controlling the longitudinal acceleration of the vehicle 20 by changing a gear ratio when power is transmitted to each wheel, and a friction brake that generates the longitudinal acceleration in the vehicle 20 by pressing a brake disc against a brake pad of each wheel.

Further, the vehicle movement control device 1 is provided with a calculation device having a storage area, calculation processing capability, signal input/output means, and the like. The vehicle movement control device calculates a command value of the longitudinal acceleration to be generated in the vehicle 20 from various information obtained from the host vehicle movement state information, the driver operation information, and the host vehicle travel path information, the acceleration/deceleration actuator that can generate the longitudinal acceleration that is the longitudinal acceleration command value is used as the longitudinal acceleration generating means, and the longitudinal acceleration command value is sent to a drive controller (brake control unit 10, driving torque control unit 12) of the acceleration/deceleration actuator (brake actuator 11, drive actuator 13). Further, the lateral movement command value to be generated in the vehicle 20 is calculated from various information obtained from the vehicle movement state information, the driver operation information, and the host vehicle traveling path information, and the steering angle control actuator 16 capable of generating the lateral movement is used as a turning movement generating means, the steering angle command value as the lateral movement command value is transmitted to the drive controller (the steering angle control unit 15) of the steering angle control actuator 16 (details will be described later).

Here, the signal sent from the vehicle movement control device 1 is not limited to the longitudinal acceleration itself, but may be any signal that can realize the longitudinal acceleration command value by the acceleration/deceleration actuator. Similarly, the signal sent from the vehicle movement control device 1 is not limited to a steering angle itself, but may be a signal that can realize a steering angle command value by the steering angle control actuator 16.

For example, when the acceleration/deceleration actuator is a combustion engine, a braking/driving torque command value capable of realizing the longitudinal acceleration command value is sent to the driving torque control unit 12. Further, the combustion engine drive signal for realizing the longitudinal acceleration command value may be sent directly to the control actuator of the combustion engine without using the driving torque control unit 12. Further, when a hydraulic friction brake that presses a brake pad against a brake disk by hydraulic pressure is used, a hydraulic pressure command value for realizing a longitudinal acceleration command value is sent to the brake control unit 10. Further, a drive signal of the hydraulic friction brake drive actuator that realizes the longitudinal acceleration command value may be sent directly to the hydraulic friction brake drive actuator without using the brake control unit 10.

Further, when the longitudinal acceleration command value is realized, the acceleration/deceleration actuator that performs drive control according to the longitudinal acceleration command value may be changed.

For example, when the combustion engine and a hydraulic friction brake are provided as the acceleration/deceleration actuator, if the longitudinal acceleration command value is within a range that can be realized by the braking/driving torque control of the combustion engine, the combustion engine is driven and controlled, and when the longitudinal acceleration command value is a negative value that cannot be realized by the braking/driving torque control of the combustion engine, the hydraulic friction brake is driven and controlled together with the combustion engine. Further, when the electric motor and the combustion engine are provided as the acceleration/deceleration actuator, the electric motor may be driven and controlled when the change over time of the longitudinal acceleration is large, and the combustion engine may be driven and controlled when the change over time of the longitudinal acceleration is small. Furthermore, when the longitudinal acceleration command value is normally driven and controlled by an electric motor, and the longitudinal acceleration command cannot be realized by the electric motor due to a battery state, other acceleration/deceleration actuators (combustion engine, hydraulic friction brake, etc.) may be driven and controlled.

Further, as the communication line 14, a communication line and a communication protocol that differ depending on signals may be used. For example, Ethernet may be used for communication with a sensor that acquires traveling path information of the host vehicle when a large amount of data needs to be exchanged, and a controller area network (CAN) may be used for communication with each actuator.

Figure 6:
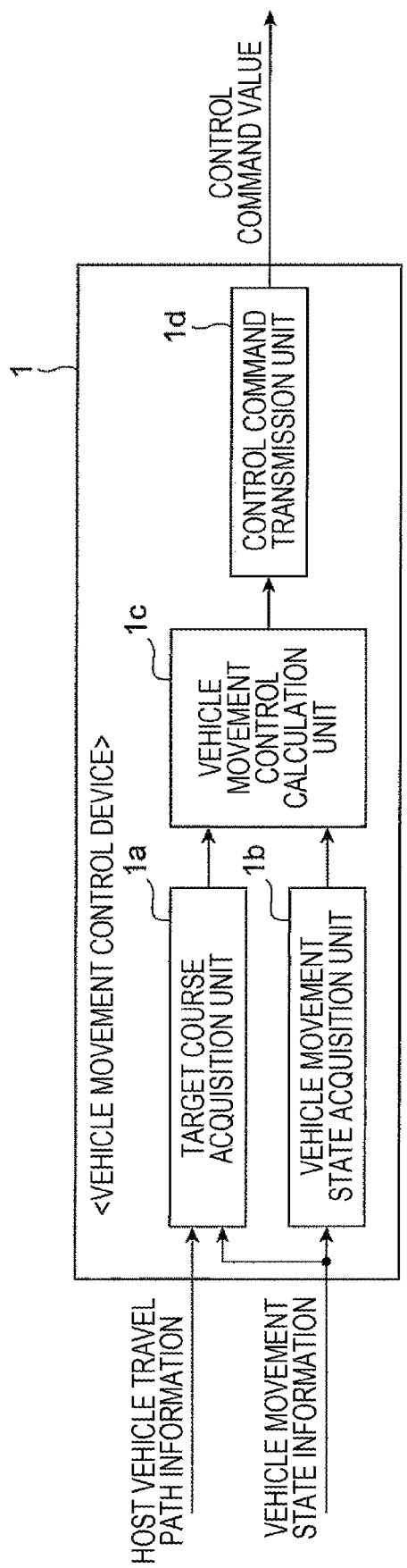
FIG. 6 is a configuration diagram of the first embodiment of the vehicle movement control device according to the present invention.

FIG. 6 is a configuration diagram of the vehicle movement control device 1 according to the first embodiment of the present invention.

As illustrated in the drawing, the vehicle movement control device 1 includes a target course acquisition unit 1a, a vehicle movement state acquisition unit 1b, a vehicle movement control calculation unit 1c, and a control command transmission unit 1d.

The target course acquisition unit 1a acquires a target course and a travelable region for causing the vehicle 20 to travel from the host vehicle travel path information and the vehicle movement state information. Here, the method of creating the target course may be a method of creating the target course from the course shape on which the host vehicle travels, and may be a method of acquiring a past travel data trajectory of the road surface on which the host vehicle travels by communication with a data center to create based on the trajectory.

The vehicle movement state acquisition unit 1b acquires the movement state (travel speed, turning state, driver operation amount, etc.) of the vehicle 20 from the vehicle movement state information.

Based on the information obtained by the target course acquisition unit 1a and the vehicle movement state acquisition unit 1*b*, the vehicle movement control calculation unit 1*c* calculates the longitudinal acceleration command value by the speed control, or both the longitudinal acceleration command value by the speed control and the steering angle command value by the steering angle control, and sends the calculation result to the control command transmission unit 1*d*.

Based on the longitudinal acceleration command value created by the vehicle movement control calculation unit 1*c*, or both the longitudinal acceleration command value and the steering angle command value, the control command transmission unit 1*d* sends a control command value to each control unit (brake control unit 10, driving torque control unit 12, steering angle control unit 15) that performs drive control of the actuator (brake actuator 11, drive actuator 13, steering angle control actuator 16) that can control the longitudinal acceleration and/or the actual tire steering angle.

Figure 7:
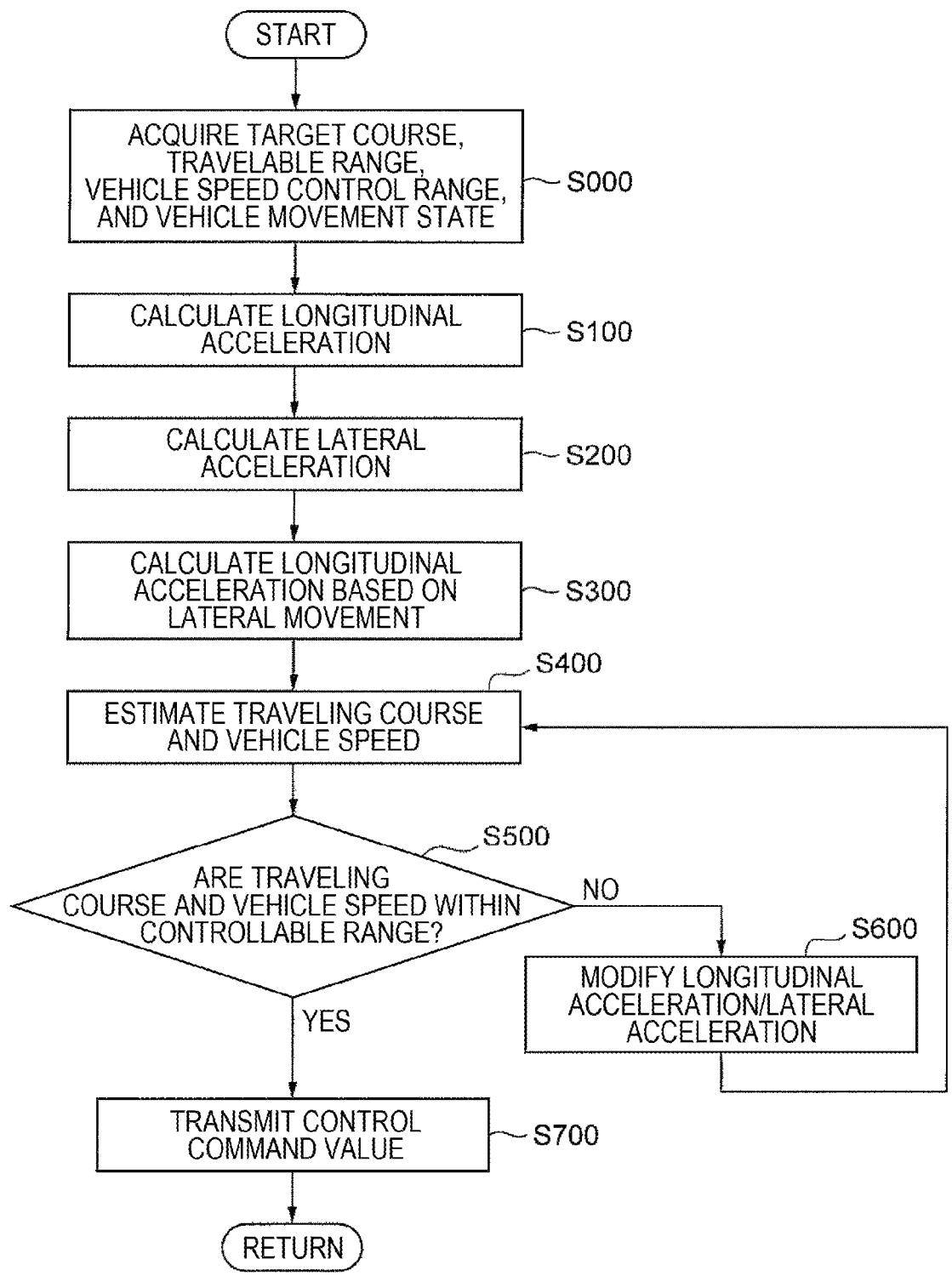
FIG. 7 is a control flowchart of the first embodiment of the vehicle movement control device according to the present invention.

FIG. 7 is a control flowchart in the vehicle movement control device 1 of the first embodiment.

Figure 8:
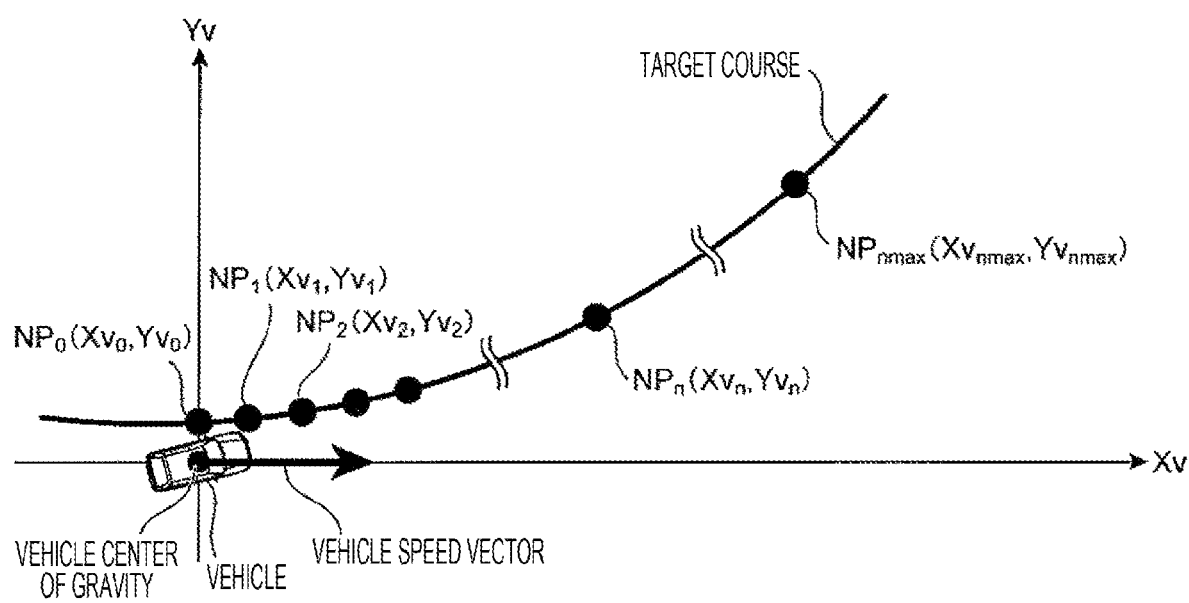
FIG. 8 is an example of a target course acquisition method according to the first embodiment of the vehicle movement control device according to the present invention.

In S000, the target course, the travelable range, the vehicle speed control range, and the vehicle motion state are acquired as described above. Here, as illustrated in FIG. 8, the target course is converted as node point position data $NP_n$ ($Xv_n$, $Yv_n$) on coordinates taking the Xv axis with vehicle center of gravity as origin and vehicle speed vector direction as positive, and the Yv axis orthogonal to the Xv axis. "n" is an integer that increases as 1, 2, . . . , nmax toward the traveling direction of the host vehicle, and 0 is the closest point to the vehicle. "nmax" is the maximum value of node point position data number n that can be acquired. Further, $Yv_0$ that is the Yv-axis component of $NP_0$ is a lateral deviation of the vehicle. Further, each node point also has information such as a travelable range at the node point position and a vehicle speed control range.

In S100, the longitudinal acceleration is calculated from the target course, the vehicle speed control range, and the vehicle movement state. For example, when the vehicle speed is higher than the vehicle speed control range, a negative longitudinal acceleration command value is calculated so as to be within the vehicle speed control range. Further, when the target course has a curved road shape (shape where the absolute value of the road curvature of the traveling road increases and reaches a maximum value or a substantially constant value), and acceleration/deceleration control corresponding to the curved road is performed, a longitudinal acceleration command value based on the curved road shape is calculated.

In S200, the lateral acceleration is calculated from the target course and the vehicle movement state. Here, when the target course has a curved road shape (a shape in which the absolute value of the road curvature of the traveling road increases and reaches a maximum value or a substantially constant value), when the lateral acceleration control according to the curved road is performed, the lateral acceleration is calculated such that the relationship between the lateral acceleration occurring to the vehicle 20 and the lateral jerk becomes the relationship illustrated in FIGS. 3 to 4A.

Figure 9:
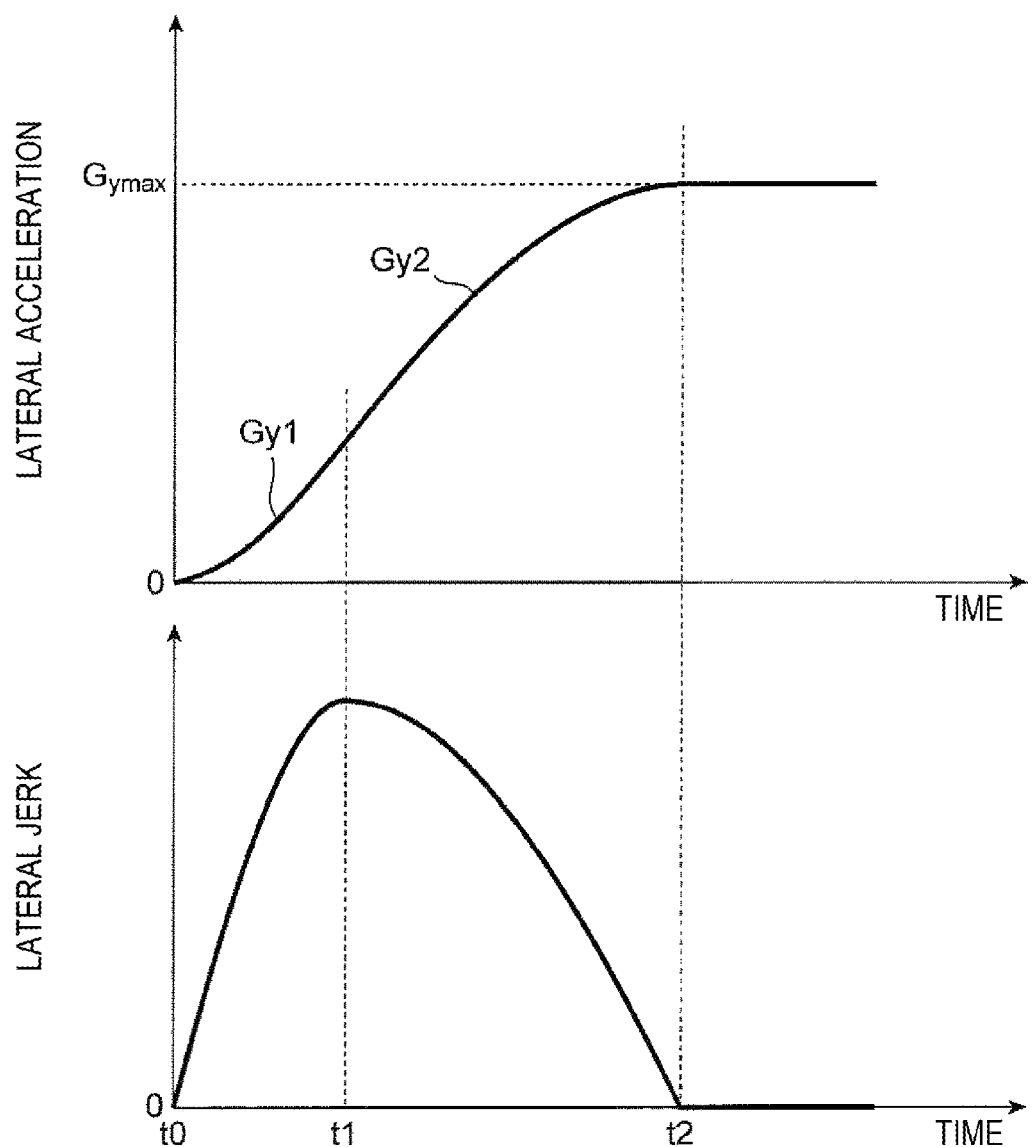
FIG. 9 is an example of calculation results of lateral acceleration and lateral jerk according to the first embodiment of the vehicle movement control device of the present invention.

For example, as illustrated in FIG. 9, if the lateral acceleration from the turning start time t0 to time t1 when the lateral jerk becomes the maximum is denoted as Gy1, and the lateral acceleration from time t1 to time t2 when the lateral acceleration becomes the lateral acceleration Gymax in the steady turning state is denoted as Gy2, Gy1 and Gy2 are given by the following equations (1) and (2) using two tuning variables ω and k and time t.

[Equation 1]

$$G_{y1} = \frac{k \cdot G_{ymax}}{1+k}(1 - \cos\omega t) \text{ (however, } t0 \le t < t1) \quad (1)$$

[Equation 2]

$$G_{y2} = \frac{G_{ymax}}{1+k}\left[k - \cos\left\{k\omega t + \frac{\pi}{2}(1-k)\right\}\right] \text{ (however, } t1 \le t < t2) \quad (2)$$

Here, by setting the value of 0<k<1, the lateral acceleration and the lateral jerk become the relationship illustrated in FIGS. 3 to 4A. Here, the period from time t1 when the lateral jerk reaches its maximum value to time t2 when the lateral jerk decreases to reach the steady turning state is longer than the period from turning start time t0 to time t1 at which the lateral jerk becomes maximum.

Returning to FIG. 7, in S300, the longitudinal acceleration based on the lateral movement is calculated. As a method for calculating the longitudinal acceleration based on the lateral movement, for example, longitudinal acceleration control based on the lateral jerk illustrated in PTL 3 can be cited.

In S400, the traveling course and vehicle speed of the vehicle 20 are estimated based on the vehicle movement state, the calculated lateral acceleration, and longitudinal acceleration.

It is determined whether or not the estimated traveling course and vehicle speed are within a controllable range. Here, if it is determined that those are out of the control range, the process proceeds to S600, and if it is determined that those are within the control range, the process proceeds to S700.

In S600, longitudinal acceleration and lateral acceleration are modified. For example, in the correction of the lateral acceleration, the traveling course is changed in S400 by changing the tuning variables ω and k indicated in equations (1) and (2). Further, by changing the control gain of the longitudinal acceleration control based on the lateral jerk described in PTL 3, the traveling course and the vehicle speed are changed in S400. Thereafter, in S500 again, it is determined whether or not the traveling course and the vehicle speed are within the controllable range.

In S700, a control command value for each actuator is calculated and transmitted based on the longitudinal acceleration command value and the lateral acceleration command value. For example, when the longitudinal acceleration is controlled using a combustion engine, and the yaw moment (lateral acceleration) is controlled using electric power steering, a braking/driving torque command value for causing the vehicle to generate the longitudinal acceleration is sent to the controller of the combustion engine, and a steering angle command value for causing the vehicle to generate the lateral acceleration is sent to the controller of the electric power steering.

As described above, in the first embodiment, the jerk generated while the vehicle 20 traveling in the straight section reaches a steady turning state is maximized in the region where the lateral acceleration occurring is small (region A in which the lateral acceleration occurring in the vehicle 20 is equal to or less than half of the lateral acceleration $G_{ymax}$ generated during steady turning), and by suppressing the acceleration change when the generated acceleration is large (region B where the lateral acceleration generated in the vehicle 20 is greater than half of the lateral acceleration $G_{ymax}$ generated during steady turning), the occurrence of unstable behavior of the vehicle 20 due to acceleration change during turning by automatic traveling control can be suppressed, and the effect of improving passenger comfort is also expected.

Second Embodiment

Next, the configuration and operation of a vehicle movement control device (target course generation device) according to a second embodiment of the present invention will be described with reference to FIGS. 10 and 11.

Figure 10:
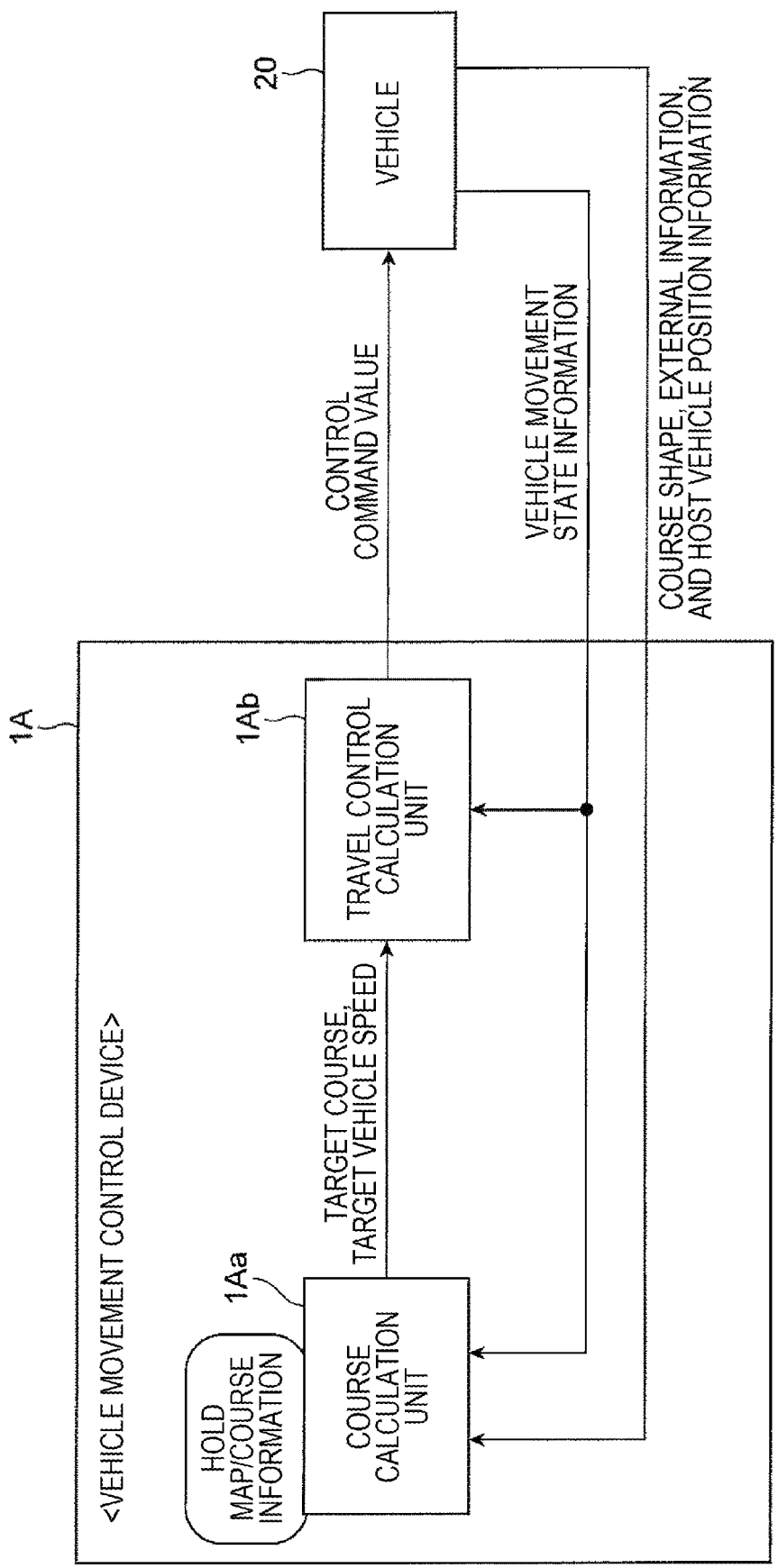
FIG. 10 is a configuration diagram of a second embodiment of the vehicle movement control device according to the present invention.

FIG. 10 is a configuration diagram of the vehicle movement control device (target course generation device) 1A according to the second embodiment of the present invention. In the example illustrated in FIG. 10, the vehicle movement control device (target course generation device) 1A is provided outside a vehicle 20, but may be provided in the vehicle 20 as in the first embodiment.

In the present embodiment, the vehicle movement control device 1A includes a plurality of calculation devices having storage area, calculation processing capability, signal input/output means, etc., and mainly includes a course calculation unit 1Aa and a travel control calculation unit 1Ab.

The course calculation unit 1Aa generates a target course and a target vehicle speed of the vehicle 20 from the course shape, the external environment information, the host vehicle position information, and the vehicle motion state information.

The travel control calculation unit 1Ab calculates, from the target course, the target vehicle speed and the vehicle movement state information, a command value of the lateral movement occurring in the vehicle 20, or both the lateral movement command value and a longitudinal acceleration command value. The acceleration/deceleration actuator that can generate the longitudinal acceleration that is the longitudinal acceleration command value is used as the longitudinal acceleration generation means to send the longitudinal acceleration command value to the drive controller (brake control unit 10, driving torque control unit 12) of the acceleration/deceleration actuator (brake actuator 11, drive actuator 13. The steering angle control actuator 16 capable of generating the command value of the lateral movement occurring in the vehicle 20 is used as a turning movement generation means to send the steering angle command value as the lateral movement command value to the drive controller (steering angle control unit 15) of the steering angle control actuator 16.

Specifically, when the target course and the target vehicle speed are generated from the course shape, the outside information, the host vehicle position information, and the vehicle movement state information, the course calculation unit 1Aa generates the target course and the target vehicle speed such that the relationship between acceleration and jerk occurring in the vehicle 20 during turning is in the form illustrated in FIGS. 3 to 4A. For example, the curvature of the target course (course curvature) when a vehicle enters a curved road from a straight line and reaches a steady turning state is an upwardly convex curve. If the target vehicle speed is substantially constant, a target course is created, as illustrated in FIG. 11, such that in the relationship between the change over time of the curvature of the target course and the curvature, time t1 when the change over time of the curvature is maximized is faster than time t3 that is $\kappa_{max}/2$ which is half of the curvature (maximum value) $\kappa_{max}$ during steady turning (steady turning state). That is, the course calculation unit 1Aa generates a target course such that the change over time of the curvature is maximized, in the transition section where the curvature of the target course is maximized or made constant from a substantially linear state, in the curvature in the vehicle 20 moving at a substantially constant speed on the target course and the change over time of the curvature, and as illustrated in FIG. 11, in a region (region C) that is equal to or less than $\kappa_{max}/2$ which is half of the maximum value $\kappa_{max}$ of the curvature of the target course. The target course generated here is a target course in which the average time value of the change over time of curvature in a region (region C) where the curvature of the target course is equal to or less than $\kappa_{max}/2$ which is half of the maximum value $\kappa_{max}$ is larger than the time average value of the change over time of curvature in a region (region D) where the curvature is larger than $\kappa_{max}/2$ which is half of the maximum value $\kappa_{max}$ of the curvature.

To realize the target course and target vehicle speed generated in the course calculation unit 1Aa as described above, the travel control calculation unit 1Ab calculates a command value of the lateral movement occurring in the vehicle 20, or both the lateral movement command value and a longitudinal acceleration command value. The acceleration/deceleration actuator that can generate the longitudinal acceleration that is the longitudinal acceleration command value is used as longitudinal acceleration generation means to send the longitudinal acceleration command value to the drive controller (brake control unit 10, driving torque control unit 12) of the acceleration/deceleration actuator (brake actuator 11, drive actuator 13). The steering angle control actuator 16 capable of generating the command value of the lateral movement occurring in the vehicle 20 is used as turning movement generation means to send the steering angle command value as the lateral movement command value to the drive controller (steering angle control unit 15) of the steering angle control actuator 16.

Figure 11:
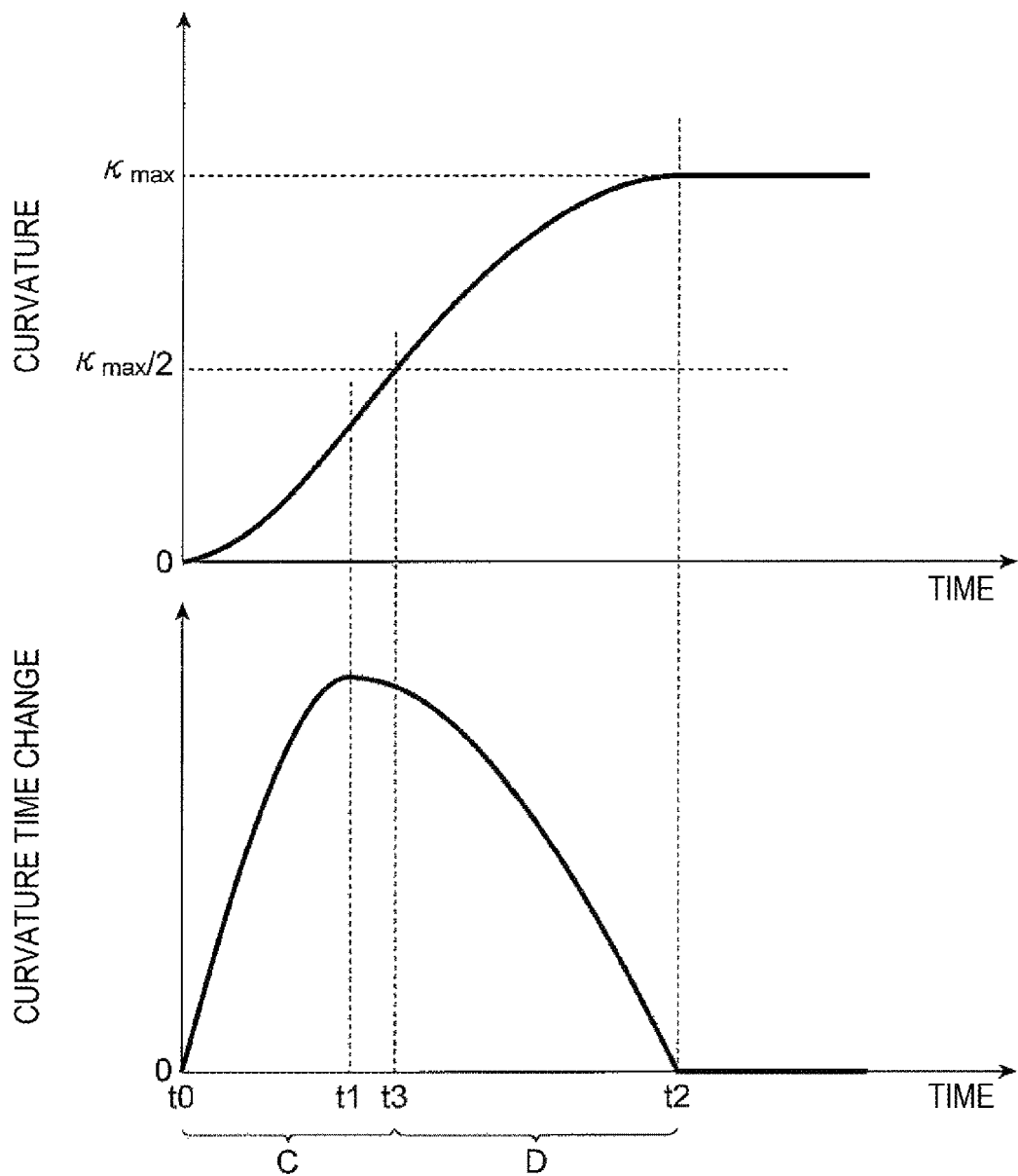
FIG. 11 is an example of the calculation results of a curvature of a target course and the change over time of the curvature according to the second embodiment of the vehicle movement control device of the present invention.

As described above, in the second embodiment, when the vehicle movement control device (the target course generation device) 1A generates the target course, by giving the constraint as illustrated in FIG. 11 to the relationship between the curvature of the target course and the change over time of the curvature, the course calculation unit 1Aa can calculate the target course and the target vehicle speed at which the relation between the acceleration and jerk occurring in the vehicle 20 that can travel within the travelable range is as illustrated in FIGS. 3 to 4A. Therefore, the same effect as the first embodiment can be obtained, the calculation load on the travel control calculation unit 1Ab side can be reduced, and control in which the course calculation device (course calculation unit 1Aa) is combined with another travel control calculation device (travel control calculation unit 1Ab) can also be realized.

The present invention is not limited to the above-described embodiments and includes various variations. For example, the above-described embodiments describe the present invention in detail for clarification, and every configurations described above may not be necessarily included. Further, a configuration of each embodiment can be partially replaced to a configuration of the other embodiment. Furthermore, a configuration of each embodiment can be added to the configuration of the other embodiment. Further, a part of a configuration of each embodiment can be added to, deleted from, and replaced from the other configuration.

Further, each of the above-described configurations, functions, process units, and process means may be realized by a hardware, for example, by designing a part of or all of them by using an integrated circuit. Further, each of the configurations and the functions may be realized by a software by interpreting and performing a program for realizing each function by a processor. Information such as a program, a table, and a file for realizing each function can be stored in a storage device such as a memory, a hard disc, and a solid state drive (SSD) or a storage medium such as an IC card, an SD card, and DVD.

Further, control lines and information lines which are considered to be necessary for description are indicated, and all of control lines and information lines on the product are not necessarily indicated. It may be considered that almost all of the configurations are actually connected with each other.

REFERENCE SIGNS LIST 1 vehicle movement control device (first embodiment)
1A vehicle movement control device (target course generation device) (second embodiment)
1a target course acquisition unit
1b vehicle movement state acquisition unit
1c vehicle movement control calculation unit
1d control command transmission unit
2 accelerator sensor
3 gyro sensor
4 steering wheel
5 steering angle sensor
6 course shape acquisition sensor
7 tire
8 wheel speed sensor
9 host vehicle position detection sensor
10 brake control unit
11 brake actuator
12 driving torque control unit
13 drive actuator
14 communication line
15 steering angle control unit
16 steering angle control actuator
17 brake pedal sensor
18 accelerator pedal sensor
19 outside information detection sensor
20 vehicle

The invention claimed is:

1. A vehicle movement control device in a vehicle, the vehicle movement control device comprising a processor and memory configured to:
calculate at least a lateral acceleration of a vehicle; and
control, based on the lateral acceleration, a resultant acceleration to reduce a resultant jerk,
when the vehicle turns such that a road curvature absolute value of a travel path increases and reaches a maximum value or is made constant,
wherein a steady turning state is defined as when the resultant acceleration during the turning is maximized,
wherein a first region is defined as a region with the resultant acceleration equal to or less than half of the resultant acceleration in the steady turning state,
wherein a second region is defined as a region with the resultant acceleration larger than half of the resultant acceleration in the steady turning state,
wherein the resultant acceleration occurring in the vehicle is controlled such that the resultant jerk, which is an absolute value of a change over time of the resultant acceleration occurring in the vehicle, is maximized in the first region, and a time average of the resultant jerk in the first region becomes larger than a time average of the resultant jerk in the second region,
wherein the resultant acceleration is obtained using an absolute value of the lateral acceleration in a vehicle lateral direction and an absolute value of a longitudinal acceleration in a vehicle longitudinal direction.

2. The vehicle movement control device according to claim 1,
wherein the resultant acceleration occurring in the vehicle is controlled such that the resultant jerk occurring in the vehicle decreases as the resultant acceleration increases in the second region.

3. The vehicle movement control device according to claim 1,
wherein the resultant acceleration occurring in the vehicle is controlled such that the change over time of the resultant acceleration is maximized in a region where a normalized acceleration is 0.3 to 0.5, and
wherein the normalized acceleration is calculated by normalizing the resultant acceleration occurring in the vehicle with the resultant acceleration in the steady turning state and the resultant jerk.

4. The vehicle movement control device according to claim 1,
wherein the resultant acceleration occurring in the vehicle is controlled such that a second period, during which the resultant jerk decreases from the maximum value and reaches the steady turning state, becomes longer than a first period, during which the resultant jerk is maximized after the vehicle begins to turn.

5. A target course generation device in a vehicle, the target course generation device comprising a processor, a memory, and a sensor configured to:
calculate a course shape;
generate, based on the course shape, a target course and a target vehicle speed of a vehicle; and
calculate, from the target course and the target vehicle speed, at least a lateral movement command value to control the vehicle;
when the vehicle turns on the target course such that a road curvature absolute value of the target course increases and reaches a maximum value or is made constant,
wherein a steady turning state is defined as when a resultant acceleration during the turning is maximized,
wherein a first region is defined as a region with the resultant acceleration equal to or less than half of the resultant acceleration in the steady turning state,
wherein a second region is defined as a region with the resultant acceleration larger than half of the resultant acceleration in the steady turning state,
wherein the target course is generated such that the resultant jerk, which is a change over time of the resultant acceleration occurring in the vehicle, is maximized in the first region, and a time average of the resultant jerk in the first region becomes larger than a time average of the resultant jerk in the second region, and
wherein the resultant acceleration is obtained using an absolute value of a lateral acceleration in a vehicle lateral direction and an absolute value of a longitudinal acceleration in a vehicle longitudinal direction.

6. The target course generation device according to claim 5,
wherein, when the target vehicle speed is constant, the target course generation device generates the target course having a road curvature, wherein a third region is defined as a region with the road curvature equal to or less than half of the maximum value of the road curvature, wherein a fourth region is defined as a region with the road curvature greater than half of the maximum value of the road curvature, wherein the target course is generated such that, in the third region, a change over time of the road curvature is maximized, and a time average value of the change over time of the road curvature in the third region becomes larger than a time average value of the change over time of the road curvature in the fourth region.

7. A method for controlling vehicle movement in a vehicle having a processor and a memory and capable of automatically controlling resultant acceleration occurring in the vehicle, the method comprising:

calculating at least a lateral acceleration; and controlling, based on the lateral acceleration, the resultant acceleration to reduce a resultant jerk, when the vehicle turns such that a road curvature absolute value of a travel path increases and reaches a maximum value or is made constant, wherein a steady turning state is defined as when the resultant acceleration during the turning is maximized, wherein a first region is defined as a region with the resultant acceleration equal to or less than half of the resultant acceleration in the steady turning state, wherein a second region is defined as a region with the resultant acceleration larger than half of the resultant acceleration in the steady turning state, wherein the resultant acceleration occurring in the vehicle is controlled such that the resultant jerk, which is an absolute value of a change over time of the resultant acceleration occurring in the vehicle, is maximized in the first region, and a time average of the resultant jerk in the first region becomes larger than a time average of the resultant jerk in the second region, wherein the resultant acceleration is obtained using an absolute value of the lateral acceleration in a vehicle lateral direction and an absolute value of a longitudinal acceleration in a vehicle longitudinal direction.

8. A method for generating a target course for a vehicle with a processor and a memory and capable of automatically controlling resultant acceleration occurring in the vehicle, the method comprising:

calculating a course shape;

generating, based on the course shape, a target course and a target vehicle speed; and calculating, from the target course and the target vehicle speed, at least a lateral movement command value to control the vehicle;

when the vehicle turns on the target course such that a road curvature absolute value of the target course increases and reaches a maximum value or is made constant, wherein a steady turning state is defined as when the resultant acceleration during the turning is maximized, wherein a first region is defined as a region with the resultant acceleration equal to or less than half of the resultant acceleration in the steady turning state, wherein a second region is defined as a region with the resultant acceleration larger than half of the resultant acceleration in the steady turning state, wherein the target course is generated such that the resultant jerk, which is a change over time of the resultant acceleration occurring in the vehicle, is maximized in the first region, and a time average of the resultant jerk in the first region becomes larger than a time average of the resultant jerk in the second region, wherein the resultant acceleration is obtained using an absolute value of a lateral acceleration in a vehicle lateral direction and an absolute value of a longitudinal acceleration in a vehicle longitudinal direction.

* * * * *